United States Patent
Kim et al.

(10) Patent No.: US 11,491,735 B2
(45) Date of Patent: Nov. 8, 2022

(54) APPARATUS AND METHODS FOR COLD-SHAPING GLASS SHEETS

(71) Applicant: CORNING INCORPORATED, Corning, NY (US)

(72) Inventors: Ki Nam Kim, Cheonan (KR); Peter Knowles, Elmira, NY (US); Christopher Lee Timmons, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/219,134

(22) Filed: Mar. 31, 2021

(65) Prior Publication Data
US 2021/0308953 A1    Oct. 7, 2021

Related U.S. Application Data

(60) Provisional application No. 63/004,155, filed on Apr. 2, 2020.

(51) Int. Cl.
*B29C 65/00*     (2006.01)
*B29C 65/48*     (2006.01)
(Continued)

(52) U.S. Cl.
CPC ...... *B29C 65/4835* (2013.01); *B29C 65/7847* (2013.01); *B29C 65/7861* (2013.01);
(Continued)

(58) Field of Classification Search
CPC ............ B29C 65/4835; B29C 65/7847; B29C 65/7861; B29C 65/7882
See application file for complete search history.

(56) References Cited

U.S. PATENT DOCUMENTS

2016/0204020 A1*  7/2016  Huang ............... B32B 37/1018
                                                       156/285
2017/0121210 A1   5/2017  Rai et al.
(Continued)

FOREIGN PATENT DOCUMENTS

| EP | 2566658 A1 | 3/2013 |
| WO | 2011/139934 A1 | 11/2011 |
| WO | 2012/118612 A1 | 9/2012 |

OTHER PUBLICATIONS

European Patent Application No. 21166642 European search report dated Aug. 26, 2021, 7 pages; European Patent Office.

*Primary Examiner* — Philip C Tucker
*Assistant Examiner* — Nickolas R Harm

(57) ABSTRACT

An apparatus for cold-shaping a glass sheet that includes: a plurality of vacuum chucks configured within a moveable table; a first automated pick mechanism proximate the table; an automated dispensing mechanism proximate the table; and a pressing apparatus. The first pick mechanism is configured to shape a glass sheet onto one of the chucks. The dispensing mechanism is configured to dispense a curable adhesive onto the glass sheet or a frame. One of the first pick mechanism and the dispensing mechanism is configured to position the frame onto the glass sheet such that the adhesive is disposed between the glass sheet and the frame. The pressing apparatus is configured to press the frame and the adhesive onto the glass sheet to define a finished glass sheet assembly. The glass sheet is bendable at ambient temperature. Methods for cold-shaping a glass sheet are also included in the disclosure.

16 Claims, 6 Drawing Sheets

(51) Int. Cl.
*B29C 65/78* (2006.01)
*C03B 23/03* (2006.01)
*B29L 31/30* (2006.01)

(52) U.S. Cl.
CPC ...... *B29C 65/7882* (2013.01); *C03B 23/0302* (2013.01); *B29L 2031/3052* (2013.01)

(56) References Cited

U.S. PATENT DOCUMENTS

| | | |
|---|---|---|
| 2017/0274626 A1 | 9/2017 | Ukrainczyk et al. |
| 2018/0188869 A1 | 7/2018 | Boggs et al. |
| 2018/0319144 A1 | 11/2018 | Faik |

* cited by examiner

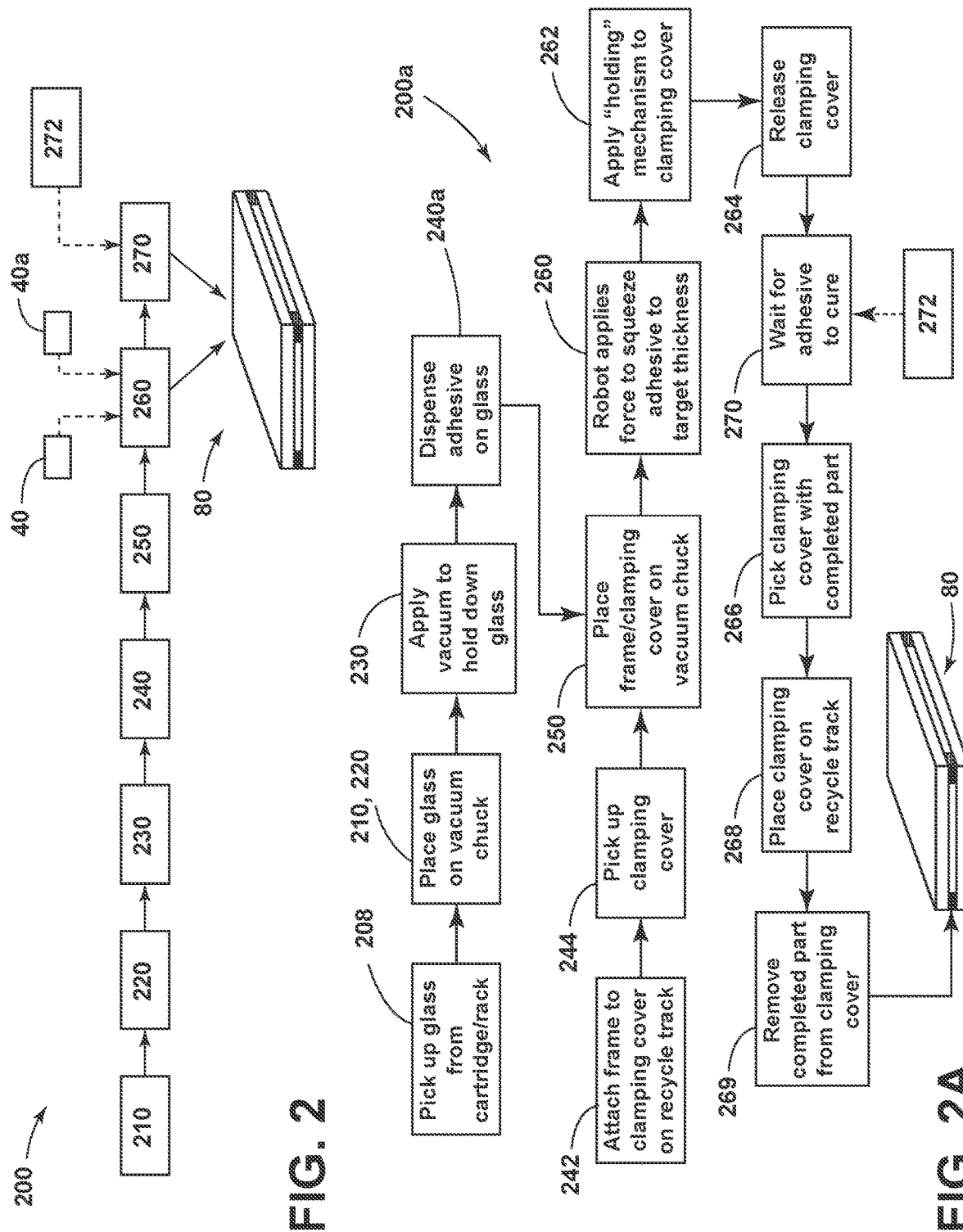

APPARATUS AND METHODS FOR COLD-SHAPING GLASS SHEETS

CROSS-REFERENCE TO RELATED APPLICATIONS

This application claims the benefit of priority under 35 U.S.C § 120 of U.S. Provisional Application Ser. No. 63/004,155 filed on Apr. 2, 2020 the content of which is relied upon and incorporated herein by reference in its entirety.

FIELD

The present disclosure generally relates to apparatus and methods for cold-shaping glass sheets, e.g., to cold-form finished glass sheet assemblies at ambient temperature for automotive applications.

BACKGROUND

Vehicle interiors include curved surfaces, and can incorporate displays (with and without touch functionality) in such curved surfaces. The materials used to form such curved surfaces are typically limited to polymers, which do not exhibit the durability and optical performance of glass. As such, curved glass substrates, sheets and assemblies are desirable, especially when used as covers for displays and/or touch panels. Existing methods of forming such curved glass substrates, such as thermal forming, have drawbacks including high cost, optical distortion, and surface marking.

Other methods that form curved glass sheets and three-dimensional glass articles at ambient temperature (e.g., "cold-forming" methods) have drawbacks. These methods typically consist of bending a glass sheet, and then joining the as-bent glass sheet with an adhesive to a rigid frame. Structural adhesives are often required for the applications of these curved sheet and finished glass assemblies, and these adhesives usually require 15 minutes or longer to cure sufficiently to reach the required bond strength. These long cure times, however, significantly reduce the throughput of the curved articles and assemblies made with these processes, generally making these processes unsuitable for scaling up to the required throughput levels for display components used in such applications (e.g., >1 finished assembly per minute).

Accordingly, there is a need for apparatus and methods for cold-shaping glass sheets. There is also a need for manufacturing apparatus and methods that employ structural adhesives to make finished glass sheet assemblies with high throughput, e.g., as suitable for various automotive applications.

SUMMARY

According to an aspect of the disclosure, an apparatus for cold-shaping a glass sheet is provided that includes: a plurality of vacuum chucks configured within a moveable table; a first automated pick mechanism proximate the table; an automated dispensing mechanism proximate the table; and a pressing apparatus. The first pick mechanism is configured to shape a glass sheet onto one of the chucks. The dispensing mechanism is configured to dispense a curable adhesive onto the glass sheet or a frame. One of the first pick mechanism and the dispensing mechanism is configured to position the frame onto the glass sheet such that the adhesive is disposed between the glass sheet and the frame. The pressing apparatus is configured to press the frame and the adhesive onto the glass sheet to define a finished glass sheet assembly. The glass sheet is bendable at ambient temperature.

According to an aspect of the disclosure, a method for cold-shaping a glass sheet is provided that includes: positioning a glass sheet on one of a plurality of vacuum chucks configured within a moveable table; cold-shaping the glass sheet onto the chuck; affixing the glass sheet to the chuck with a vacuum; applying a curable adhesive onto one or both of a primary surface of the glass sheet and a primary surface of the frame; positioning the frame onto the adhesive and the glass sheet such that the adhesive is disposed between the glass sheet and the frame; pressing the frame and the adhesive onto the glass sheet to define a finished glass sheet assembly; and curing the adhesive for a duration. The glass sheet is bendable at ambient temperature.

According to another aspect of the disclosure, an apparatus for cold-shaping a glass sheet is provided that includes: a plurality of vacuum chucks configured within a moveable table; a first automated pick mechanism proximate the table; an automated dispensing mechanism proximate the table; and a clamping fixture. The first pick mechanism is configured to shape a glass sheet onto one of the chucks. The dispensing mechanism is configured to dispense a curable adhesive onto the glass sheet or a frame. One of the first pick mechanism and the dispensing mechanism is configured to position the frame onto the glass sheet such that the adhesive is disposed between the glass sheet and the frame. The clamping fixture is configured to press the frame and the adhesive onto the glass sheet to define a finished glass sheet assembly. Further, the glass sheet is bendable at ambient temperature.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which:

FIG. 2 is a flow chart schematic of a method for cold-shaping a glass sheet, according to an embodiment.

FIG. 2A is a flow chart schematic of a manufacturing method for cold-shaping a glass sheet, according to an embodiment.

DETAILED DESCRIPTION

Figure 1:
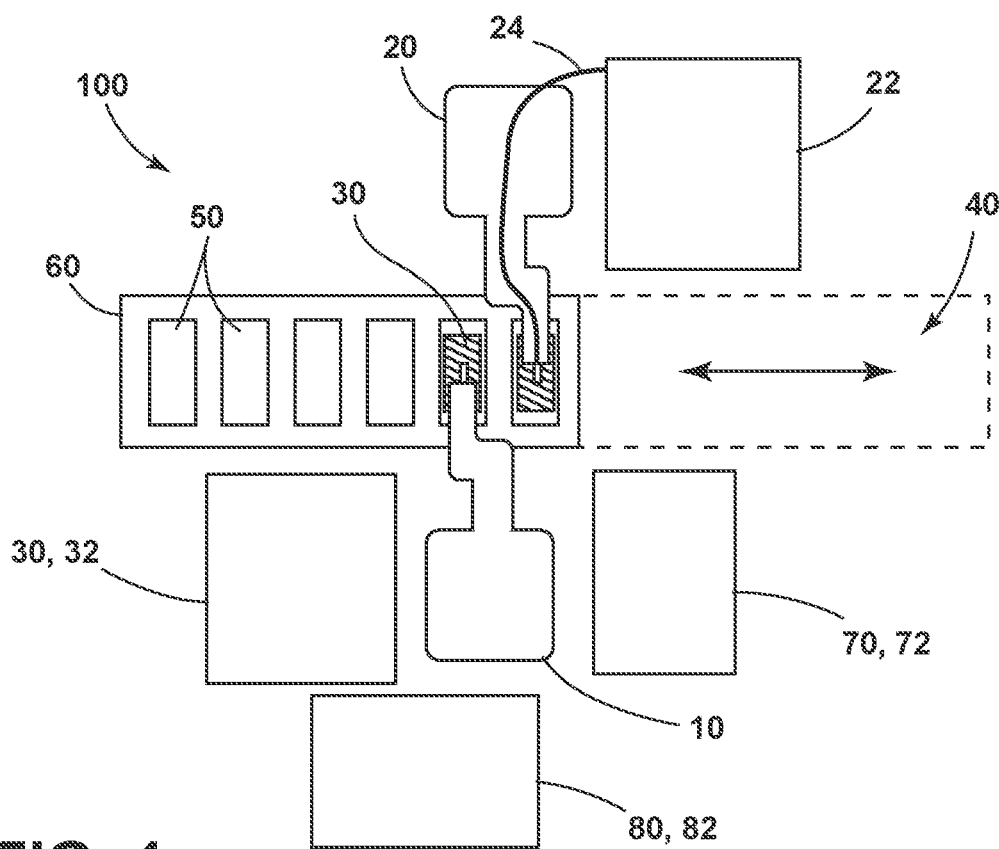
FIG. 1 is a plan view schematic of a manufacturing apparatus with a moveable table for cold-shaping glass sheets, according to an embodiment.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

As used herein, the terms "cold-bent", "cold-bending", "cold-shaped", "cold-shaping", "cold-formed" or "cold-forming" refer to curving and shaping a glass substrate or sheet at a cold-form temperature, e.g., ambient temperature, which is less than the strain point or the softening point of the glass employed in the sheet or substrate.

Aspects of the disclosure generally pertain to apparatus and methods for cold-shaping glass sheets. These glass sheet assemblies can be employed in various automotive applications, including interior displays (e.g., within dashboard or center console displays). The apparatus of the disclosure are aimed at automating processes for fabricating three-dimensional (3D) cold-formed glass sheets, articles and displays for automotive applications. These apparatus and methods generally include bending or otherwise shaping a glass sheet and adhering the glass sheet to a frame using an adhesive, such as a structural adhesive which requires 15 minutes or longer for curing. The apparatus and methods of the disclosure provide automation for these methods of cold-forming glass sheets that rely on structural adhesives to achieve high throughput levels (>1 parts/min).

Embodiments of the apparatus and methods of the disclosure with a linear layout demonstrate advantages over conventional processes and equipment for shaping glass sheet(s), including cold-forming and thermal-forming approaches for bending glass sheets. The linear layout provides a compact arrangement of chucks and associated equipment. The linear layout also allows for the use of various chuck technologies, including vacuum chucks, as the chucks are easily connected to services. Another benefit of the linear layout of embodiments of the apparatus of the disclosure is that the layout is scalable to a few or higher numbers of chucks based on the throughput requirements of the line and length of cure time of the adhesive employed in the process. A further benefit of the cold-forming apparatus and methods of the disclosure is that they are configured to minimize or otherwise eliminate the curing time of the adhesive being a critical factor in the overall throughput of the process, as these adhesives are often structural adhesives with curing times in excess of 15 minutes.

Other embodiments of the apparatus and methods of the disclosure employ clamping covers to secure the frame to the glass sheet during curing of the adhesive, e.g., a structural adhesive. A benefit of these clamping covers is that they can be removed from overhead of the chucks (e.g., vacuum chucks) to facilitate and enable an automated pick mechanism to pick and place the glass sheets and dispense the adhesive without interference from the clamping cover. Another benefit of these clamping covers is that they provide flexibility for multiple shapes and sizes for the glass sheets and articles while providing a consistent presentation to the robot(s) utilized by the apparatus and methods for cold-forming the glass sheet.

Referring to FIG. 1, an apparatus 100 for cold-shaping a glass sheet 30 is shown in schematic form. The apparatus 100 includes a plurality of vacuum chucks 50 that are configured within a moveable table 60; and a first automated pick mechanism 10 that is situated proximate to the table 60. In some embodiments, as shown in exemplary form in FIG. 1, the table 60 is arranged in a linear configuration. In such a linear configuration, the moveable table 60 can consist of a single row of the plurality of the vacuum chucks 50. The apparatus 100 shown in FIG. 1 also includes an automated dispensing mechanism 20 that is situated proximate the table 60; and a pressing apparatus 40. The first pick mechanism 10 is configured to shape the glass sheet 30 onto one of the chucks 50. The dispensing mechanism 20 is configured to dispense a curable adhesive 24 onto the glass sheet 30 or a frame 70. One of the first pick mechanism 10 and the dispensing mechanism 20 is configured to position the frame 70 onto the glass sheet 30 such that the adhesive 24 is disposed between the glass sheet 30 and the frame 70. Further, the pressing apparatus 40 is configured to press the frame 70 and the adhesive 24 onto the glass sheet 30 to define a finished glass sheet assembly 80 (see also FIG. 1C, and corresponding description below). In addition, the glass sheet 30 is bendable at ambient temperature. In addition, the first automated pick mechanism 10 and the automated dispensing mechanism 20 can be an automated pick robot, an automated gantry, or another automated mechanism suitable to conduct the functions of these elements as understood by those in the field of the disclosure.

Referring again to the apparatus 100 depicted in exemplary form in FIG. 1, the automated dispensing mechanism 20 is situated proximate the table 60, and is configured to dispense a curable adhesive 24 onto the glass sheet 30 or the frame 70. In some embodiments, dispensing equipment 22 is arranged in proximity to the dispensing mechanism 20. The dispensing equipment 22 can be configured to store and convey the curable adhesive 24 to the dispensing mechanism 20. In some embodiments, the dispensing mechanism 20 dispenses the curable adhesive 24 onto the glass sheet 30 (e.g., onto one of the primary surfaces of the sheet 30) before it is placed and shaped onto one of the plurality of vacuum chucks 50. In other embodiments, the dispensing mechanism 20 dispenses the curable adhesive 24 onto the glass sheet 30 after it has been placed and shaped onto one of the plurality of vacuum chucks 50. According to an additional implementation, the dispensing mechanism 20 can dispense the curable adhesive 24 onto the frame 70 (e.g., onto one of the primary surfaces of the frame), before the frame 70 is positioned on the glass sheet 30 by one of the first automated pick mechanism 10 and the dispensing mechanism 20. In an additional implementation, the dispensing mechanism 20 can apply the curable adhesive 24 onto both of the glass sheet 30 and the frame 70.

As also shown in FIG. 1 in exemplary form, the apparatus 100 includes a first automated pick mechanism 10 situated proximate the table 60. The first pick mechanism 10 is configured to shape the glass sheet 30 onto one of the plurality of vacuum chucks 50. The mechanism 10 can accomplish this action by picking the glass sheet 30 from a glass sheet cassette 32, and then shaping that glass sheet 30 onto one of the plurality of vacuum chucks 50, as shown in FIG. 1. In embodiments, the glass sheet cassette 32 holds and secures a plurality of glass sheets 30, providing easy access for the first pick mechanism 10 to pick and shape them onto the vacuum chucks 50.

Referring again to the apparatus 100 depicted in exemplary form in FIG. 1, the pressing apparatus 40 is configured to press the frame 70 and the adhesive 24 onto the glass sheet 30 to define a finished glass sheet assembly 80. The pressing apparatus 40 can be any suitable fixture, apparatus or device capable of applying pressure between the frame 70, the adhesive 24 and the glass sheet 30 while the adhesive 24 is subjected to its curing cycle (e.g., a curing duration of 15 minutes or more). According to some embodiments, the pressing apparatus 40 is configured to control a thickness of the adhesive 24 disposed between the frame 70 and the glass sheet 30. In some embodiments, the first automated pick mechanism 10 can pick the finished glass sheet assembly 80 and place or otherwise secure it within a finished part cassette 82, as shown in FIG. 1.

Still referring to FIG. 1, the apparatus 100 for cold-shaping a glass sheet 30 employs a curable adhesive 24. According to embodiments, the curable adhesive 24 is a thermoset polymer and/or a structural adhesive, with curing times or durations of at least 15 minutes, e.g., a curing time from about 15 minutes to 45 minutes. In some embodiments, the curable adhesive 24 is cured for these durations using thermal energy, ultraviolet (UV) light and/or infrared light (IR). In some embodiments, the curable adhesive 24 is cured at ambient temperature for the prescribed duration, e.g., at least 15 minutes. According to some embodiments, the adhesive 24 is optically clear. As noted earlier, in some implementations, the adhesive 24 is a structural adhesive that may include, but is not limited to, an adhesive selected from one or more of the categories: (a) Toughened Epoxy (for example, Masterbond EP21TDCHT-LO, 3M Scotch Weld Epoxy DP460 Off-white); (b) Flexible Epoxy (for example, Masterbond EP21TDC-2LO, 3M Scotch Weld Epoxy 2216); (c) Acrylics and/or Toughened Acrylics (for example, LORD Adhesive 403, 406 or 410 Acrylic adhesives with LORD Accelerator 19 or 19 GB w/LORD AP 134 primer, LORD Adhesive 850 or 852/LORD Accelerator 25 GB, Loctite HF8000, Loctite AA4800); (d) Urethanes (for example, 3M Scotch Weld Urethane DP640 Brown, Sikaflex 552 and Polyurethane (PUR) Hot Melt adhesives such as, Technomelt PUR 9622-02 UVNA, Loctite HHD 3542, Loctite HHD 3580, 3M Hotmelt adhesives 3764 and 3748); and (e) Silicones (e.g., Dow Corning 995, Dow Corning 3-0500 Silicone Assembly adhesive, Dow Corning 7091, SikaSil-GP). In some cases, the apparatus 100 can employ an adhesive 24 in the form of a structural adhesive such as a sheet or film (for example, but not limited to, 3M Structural adhesive films AF126-2, AF 163-2M, SBT 9263 and 9214, Masterbond FLM36-LO). In some cases, structural adhesives available in sheet format (such as B-staged epoxy adhesives) may be utilized to simplify the process. Furthermore, pressure sensitive structural adhesives such as 3M VHB tapes may be utilized for the adhesive 24.

According to some embodiments of the apparatus 100 depicted in FIG. 1, the thickness of the adhesive 24 can be tailored to ensure lamination of the frame 70 and the glass sheet 30. For example, the adhesive 24 can have a thickness of about 1 mm or less. In some embodiments, the adhesive 24 has a thickness in the range from about 200 µm to about 500 µm, from about 225 µm to about 500 µm, from about 250 µm to about 500 µm, from about 275 µm to about 500 µm, from about 300 µm to about 500 µm, from about 325 µm to about 500 µm, from about 350 µm to about 500 µm, from about 375 µm to about 500 µm, from about 400 µm to about 500 µm, from about 200 µm to about 475 µm, from about 200 µm to about 450 µm, from about 200 µm to about 425 µm, from about 200 µm to about 400 µm, from about 200 µm to about 375 µm, from about 200 µm to about 350 µm, from about 200 µm to about 325 µm, from about 200 µm to about 300 µm, or from about 225 µm to about 275 µm.

According to embodiments of the apparatus 100 depicted in FIG. 1, the frame 70 may be fabricated with one or more materials with the necessary rigidity and other mechanical properties to hold the glass sheet 30 in its desired cold-formed shape during the time necessary for the adhesive 24 to cure. The materials can include, but are not limited to, metal alloys, composites, and polymeric materials. In one or more embodiments, the frame 70 may be mounted to or otherwise include a liquid crystal matrix and one or more decorative layers. In one or more embodiments, the frame 70 may include a display panel (which may include an LCD, OLED display, transmissive display or reflective display) or a touch panel, or the combination of a display and touch panel. In one or more embodiments, the frame 70 may include a backlight unit for the display unit or a frame.

According to embodiments of the apparatus 100 depicted in FIG. 1, the plurality of chucks 50 employs vacuum chucks. As one aspect of the apparatus 100 of the disclosure is aimed at increasing the throughput of cold-formed glass sheets that employ a structural adhesive with a curing time in excess of 15 minutes, the apparatus 100 can employ a number of vacuum chucks 50 as shown in FIG. 1. Typical dimensions of each chuck range from 50 to 300 mm×500 to 1500 mm, e.g., 200 mm×1000 mm. Further, the vacuum chucks 50 may be formed from plastic materials (e.g., PC/ABS, PVC, Delrin, etc.), metals (Al-alloys, Fe-alloys, etc.) or the like. In the exemplary configuration depicted in FIG. 1, the vacuum chucks 50 are supplied with compressed air and power within the moveable table 60. In this configuration, the chucks 50 are mounted on a motion slide within the table 60, and the number of chucks 50 can be varied by simply changing the length of the motion slide within the table 60.

In the embodiment of the apparatus 100 shown in FIG. 1, the glass sheet 30 can have a thickness (t) that is substantially constant. The thickness (t) as used herein refers to the maximum thickness of the glass sheet 30 (see also FIG. 1C, and corresponding description below). The glass sheet 30 can include a width (W) defined as a first maximum dimension of one of the first or second major surfaces orthogonal to the thickness (t), and a length (L) defined as a second maximum dimension of one of the first or second surfaces orthogonal to both the thickness and the width. In other embodiments, the dimensions discussed herein may be average dimensions.

In one or more embodiments of the apparatus 100 depicted in FIG. 1, the glass sheet 30 has a thickness (t) that is about 1.5 mm or less (see also FIG. 1C, and corresponding description below). For example, the thickness may be in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments of the apparatus depicted in FIG. 1, the glass sheet 30 (see also FIG. 1C, and corresponding description below) has a width (W) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 105 cm, from about 5 cm to about 100 cm, from about 5 cm to about 90 cm, from about 5 cm to about 80 cm, or from about 5 cm to about 75 cm.

In one or more embodiments of the apparatus 100 depicted in FIG. 1, the glass sheet 30 (see also FIG. 1C, and corresponding description below) has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 105 cm, from about 5 cm to about 100 cm, from about 5 cm to about 90 cm, from about 5 cm to about 80 cm, or from about 5 cm to about 75 cm.

According to some implementations of the apparatus 100 depicted in FIG. 1, the glass sheet 30 may be strengthened. In one or more embodiments, the glass sheet 30 may be strengthened to include compressive stress that extends from a surface to a depth of compression (DOC). The compressive stress regions are balanced by a central portion exhibiting a tensile stress. At the DOC, the stress crosses from a positive (compressive) stress to a negative (tensile) stress.

In one or more embodiments of the apparatus 100 depicted in FIG. 1, the glass sheet 30 may be chemically strengthened by ion exchange. In the ion exchange process, ions at or near the surface of the glass sheet 30 are replaced by—or exchanged with—larger ions having the same valence or oxidation state. In those embodiments in which the glass sheet 30 comprises an alkali aluminosilicate glass, ions in the surface layer of the article and the larger ions are monovalent alkali metal cations, such as $Li^+$, $Na^+$, $Rb^+$, and $Cs^+$. Alternatively, monovalent cations in the surface layer may be replaced with monovalent cations other than alkali metal cations, such as $Ag^+$ or the like. In such embodiments, the monovalent ions (or cations) exchanged into the glass sheet 30 generate a stress.

Suitable glass compositions for use in the glass sheet 30 include soda lime glass, aluminosilicate glass, borosilicate glass, boroaluminosilicate glass, alkali-containing aluminosilicate glass, alkali-containing borosilicate glass, and alkali-containing boroaluminosilicate glass. As noted earlier, the glass sheet 30 can be bendable at ambient temperature. In some embodiments, the glass sheet 30 is bendable at temperatures less than the softening point of the glass of the glass sheet 30. An exemplary glass composition of the glass sheet 30 includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Figure 1A:
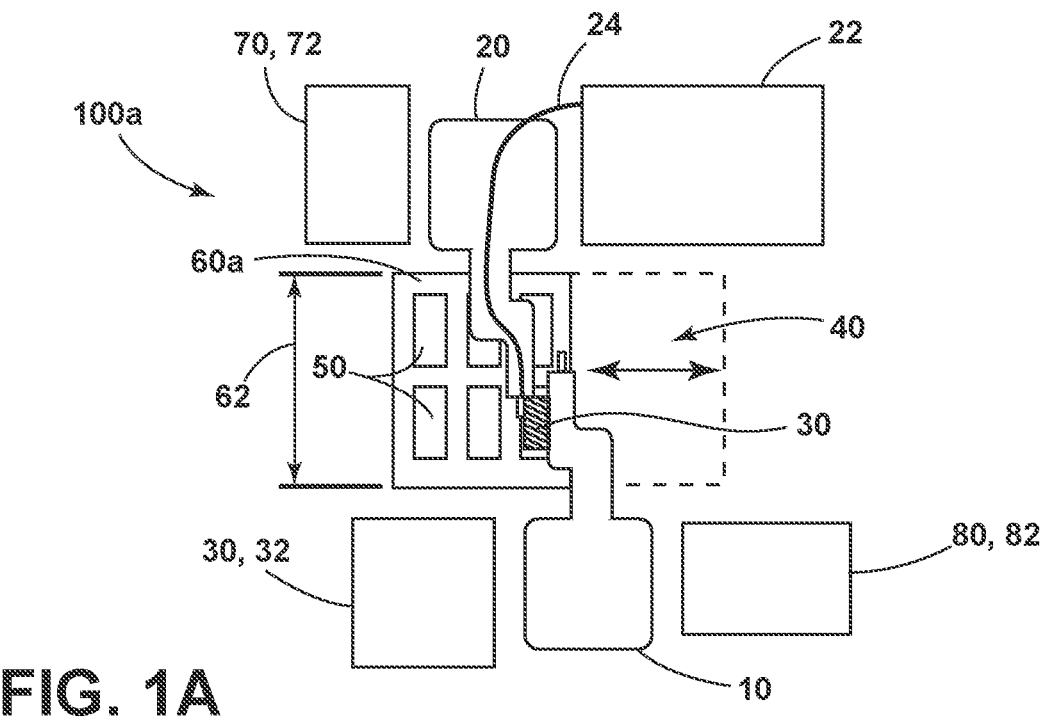
FIG. 1A is a plan view schematic of a manufacturing apparatus with a moveable table in a linear configuration with two rows of vacuum chucks for cold-shaping glass sheets, according to an embodiment.

Referring now to FIG. 1A, a plan view schematic is provided of an apparatus 100a for cold-shaping glass sheet 30 with a moveable table 60a that includes multiple rows of chucks 50. Unless otherwise noted, the apparatus 100a is substantially similar in function and structure to the apparatus 100 depicted in FIG. 1, and like-numbered elements have the same or substantially the same structure and function. As depicted in FIG. 1A, the apparatus 100a includes a moveable table 60a which is further defined by a width 62 that comprises a plurality of rows, with each row comprising a plurality of chucks 50. As shown in exemplary form in FIG. 1A, the apparatus 100a for cold-shaping a glass sheet 30 includes a moveable table 60a that is arranged in a linear configuration with two rows of vacuum chucks 50. An advantage of the apparatus 100a for cold-shaping a glass sheet 30 is that it is arranged in a double-wide configuration which results in a more compact layout with less overall length and a lower surface area footprint relative to a single-row arrangement with the same number of chucks 50.

Figure 1B:
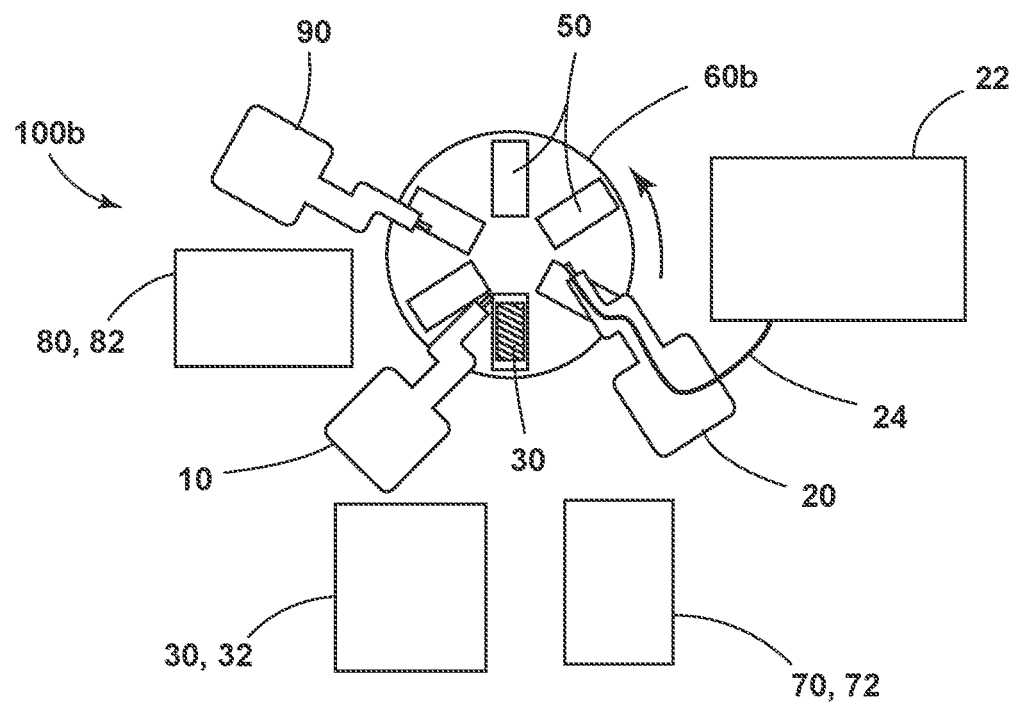
FIG. 1B is a plan view schematic of a manufacturing apparatus with a moveable table in a rotary configuration with multiple vacuum chucks for cold-shaping glass sheets, according to an embodiment.

Referring now to FIG. 1B, a plan view schematic is provided of an apparatus 100b for cold-shaping glass sheet 30 with a moveable table 60b arranged in a rotary configuration. Unless otherwise noted, the apparatus 100b is substantially similar in function and structure to the apparatus 100 depicted in FIG. 1, and like-numbered elements have the same or substantially the same structure and function. As depicted in FIG. 1B, the apparatus 100b includes a moveable table 60b with a rotary configuration in which glass sheets 30 are cold-shaped on the chucks 50 and joined to frames 70 with adhesive 24 in the direction of the arrow until formed into finished glass sheet assemblies 80. As also shown in FIG. 1B, the apparatus 100b can include a second automated pick mechanism 90 (e.g., an automated pick robot, an automated gantry, or other automated mechanism suitable for the described functions as understood by those in the field of the disclosure) arranged proximate to the moveable table 60b. Further, the second pick mechanism 90 can be configured to move each finished glass sheet assembly 80 off of the table 60b, e.g., into a finished part cassette 82. An advantage of the apparatus 100b for cold-shaping a glass sheet 30 is that it is arranged in a rotary configuration which results in a more compact layout with less overall length and a lower surface area footprint relative to a single-row arrangement with the same number of chucks 50. The cold-shaping apparatus 100b is also advantageous in the sense that its automated mechanisms, such as the first automated pick mechanism 10 and automated dispensing mechanism 20, are not required to possess the additional reach necessary for the robots employed in the double-wide and comparable arrangements of the apparatus 100a depicted in FIG. 1A. Another advantage of the apparatus 100b is that it can be arranged to minimize the number of chucks 50 necessary to achieve the higher throughputs indicative of the cold-shaping apparatus of this disclosure, e.g., >1 to 2 parts/minute.

Figure 1C:
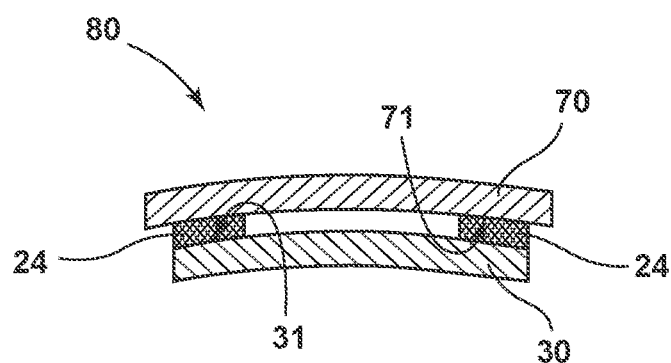
FIG. 1C is a cross-sectional, schematic view of a finished glass sheet assembly, according to an embodiment.

Referring now to FIG. 1C, a cross-sectional, schematic view of a finished glass sheet assembly 80 is provided. The finished glass sheet assembly 80 can be formed for any of the apparatus 100, 100a, and 100b depicted in FIGS. 1-1B. As shown in FIG. 1C, the finished glass sheet assembly 80 includes a frame 70 that is joined to glass sheet 30 with adhesive 24 at primary surfaces 71 and 31 of the frame 70 and glass sheet 30, respectively. The glass sheet 30 is cold-formed with the apparatus 100-100b (see FIGS. 1-1B), and joined to the frame 70 with the adhesive 24. The frame 70 holds the shape of the glass sheet 30 while the adhesive 24 is curing. Upon curing, the frame 70 retains the glass sheet 30 in its cold-formed shape, as joined to the sheet 30 with adhesive 24.

Referring now to FIG. 2, a flow chart schematic is provided of a method 200 for cold-shaping a glass sheet 30. The method 200 for cold-shaping a glass sheet 30 can employ any of the apparatus 100, 100a and 100b depicted in FIGS. 1-1B to produce finished glass sheet assemblies 80. As shown in exemplary form in FIG. 2, the method 200 includes a step 210 of positioning a glass sheet 30 on one of a plurality of chucks 50 (e.g., vacuum chucks) configured within a moveable table 60. The method 200 also includes a step 220 of cold-shaping the glass sheet 30 onto the chuck 50, e.g., at ambient temperature. The method 200 further includes a step 230 of affixing the glass sheet 30 to the chuck 50 with a vacuum; and a step 240 of applying a curable adhesive 24 onto one of the glass sheet 30 and a frame 70 (e.g., onto one or both of the primary surfaces 71, 31 of the frame 70 and glass sheet 30, respectively, as shown in FIG. 1C). In addition, the method 200 includes a step 250 of positioning the frame 70 onto the adhesive 24 and the glass sheet 30 such that the adhesive is disposed between the glass sheet and the frame; and a step 260 of pressing the frame 70 and the adhesive 24 onto the glass sheet 30 to define a finished glass sheet assembly 80 (see also FIG. 1C, and corresponding description). As shown in FIG. 2, the step 260 of pressing the frame 70 can be conducted with a pressing apparatus 40 (see FIG. 1-1B) or a clamping fixture 40a (see FIGS. 3A-3C). In addition, the method 200 depicted in FIG. 2 includes a step 270 of curing the adhesive 24 for a duration 272, e.g., greater than or equal to 15 minutes. Further, according to the method 200 depicted in FIG. 2, the glass sheet 30 can be bendable at ambient temperature.

Figure 3A:
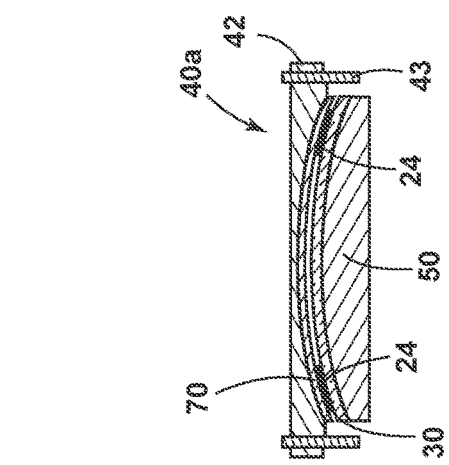
FIGS. 3A-3C are cross-sectional, schematic views of a clamping fixture and pick robot during steps of pressing a frame and an adhesive onto a glass sheet, according to an embodiment.
Figure 3B:
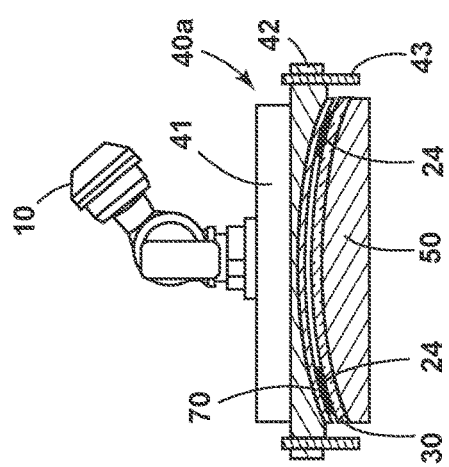
Figure 3C:
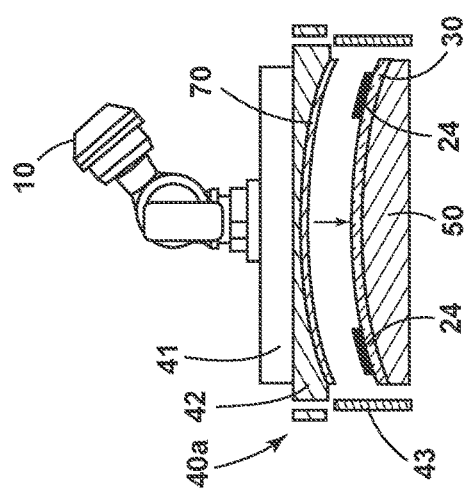

According to embodiments of the method 200 depicted in FIG. 2, e.g., as employing the apparatus 100-100b (see FIGS. 1-1B), the step 260 can be further conducted to control a thickness of the adhesive 24 disposed between the glass sheet 30 and the frame 70. In some implementations, the moveable table employed in the method 200 can be arranged in a linear configuration (see FIGS. 1, 1A, moveable table 60, 60a). In other implementations, the method 200 can be conducted by employing an apparatus with a moveable table arranged in a rotary configuration (see FIG. 1B, moveable table 60b). According to some embodiments, the method 200 can be conducted such that the step 210 of positioning a glass sheet 30 and the step 220 of cold-shaping the glass sheet 30 are conducted with a first automated pick mechanism (e.g., a first automated pick mechanism 10 shown in FIGS. 1-1B). In some implementations, the method 200 can be conducted such that the applying step 240 is conducted with an automated dispensing mechanism (e.g., an automated dispensing mechanism 20 as shown in FIGS. 1-1B). According to some embodiments of the method 200, the step 260 of pressing the frame can be conducted with a clamping fixture (e.g., clamping fixture 40a as shown in FIGS. 3A-3C). The method 200 for cold-shaping a glass sheet 30, as depicted in FIG. 2, can be conducted with an adhesive 24 that is a thermoset adhesive, and such that the curing step 270 is conducted with thermal energy, and the duration 272 is at least 15 minutes.

Referring now to FIG. 2A, a flow chart schematic is provided of a method 200a for cold-shaping a glass sheet 30. The method 200a depicted in FIG. 2A is an exemplary embodiment of the method 200 depicted in FIG. 2, and described earlier. As such, like-numbered elements in FIGS. 2 and 2A have the same, or substantially the same, function and/or structure. Further, the method 200a for cold-shaping a glass sheet 30 can employ any of the apparatus 100, 100a and 100b depicted in FIGS. 1-1B to produce finished glass sheet assemblies 80.

As shown in exemplary form in FIG. 2A, the method 200a includes a step 208 of picking up a glass sheet 30 from a cartridge, rack or the like (e.g., a glass cassette 32, as shown in FIGS. 1-1B). The method 200a includes a step 210 of positioning a glass sheet 30 on one of a plurality of vacuum chucks 50 configured within a moveable table 60. The method 200a also includes a step 220 of cold-shaping the glass sheet 30 onto the chuck 50, e.g., at ambient temperature. As also shown in FIG. 2A, the glass sheet 30 can be held against the chuck 50 with a vacuum in step 230. The method 200a further includes a step 240a of applying a curable adhesive 24 onto the glass sheet 30, e.g., as it is being held or otherwise affixed to the chuck 50 during step 230. At this point, the method 200a includes a step 250 of positioning the frame 70 onto the adhesive 24 and the glass sheet 30. As a precursor to step 250, the method 200a also includes a step 242 of attaching a frame (e.g., frame 70) to the clamping cover (e.g., clamping cover 42) from a recycling track, as depicted in FIG. 2A; and a step 244 of picking up the clamping cover, as attached to a frame, e.g., by an automated pick mechanism (e.g., a first automated pick mechanism 10 as shown in FIGS. 1-1B). The method 200a further includes a step 260 of pressing the frame 70 and the adhesive 24 onto the glass sheet 30, e.g., to squeeze the adhesive 24 down to a target thickness. The method 200a also includes a step 262 of applying a holding mechanism to the clamping cover to ensure that the frame is held in place on the glass sheet during the curing process. Further, the method 200a includes a step 264 for releasing the holding mechanism of the clamping cover during or after the completion of the following step, step 270. In particular, the method 200a includes a step 270 of waiting for the adhesive 24 disposed between the glass sheet and the frame to cure, e.g., for a duration 272, which can be 15 minutes or longer. The method 200a further includes a step 266 of picking up the clamping cover (as removed from the frame/glass sheet assembly) with the finished glass sheet assembly 80. Finally, the method 200a includes a step 268 of moving or placing the clamping cover with the finished glass sheet assembly 80 onto a recycling track, and the conducting step 269 to remove the finished glass sheet assembly 80 from the clamping cover. At this point, one or more of the automated mechanisms (e.g., pick robots) employed by the method 200a can move the finished glass sheet assembly 80 to a finished part cassette, e.g., finished part cassette 82 (see FIGS. 1-1B).

Referring now to FIGS. 3A-3C, cross-sectional, schematic views of a clamping fixture 40a and a first automated pick mechanism 10 are provided. In FIG. 3A, the clamping fixture 40a, as holding a frame 70, is shown as being positioned over a glass sheet 30 by an automated pick mechanism 10. In this configuration, the adhesive 24 has been applied onto the glass sheet 30 (e.g., by an automated dispensing mechanism 20, as shown in FIGS. 1-1B) and the glass sheet 30 has been shaped onto a chuck 50. As also shown in FIG. 3A, the clamping fixture 40a can include a force distribution plate 41, clamping cover 42 and guides 43. In such a configuration, the clamping fixture 40a shown in FIG. 3A is being positioned over the glass sheet 30 such that holes in the clamping cover 42 are aligned with the guides 43.

Referring now to FIG. 3B, the clamping fixture 40a is positioned and directed by the first automated pick mechanism 10 to press the frame 70 and the adhesive 24 onto the glass sheet 30. As shown in FIG. 3B, the adhesive 24 is disposed between the glass sheet 30 and the frame 70. Further, the automated pick mechanism 10 has directed the clamping cover 42 along the guides 43 to ensure that the frame 70 is properly aligned with the glass sheet 30 and the adhesive 24. In addition, the automated pick mechanism 10, as shown in FIG. 3B, can apply a substantially equal force through the force distribution plate 41 to the clamping cover 42 and frame 70 to ensure that the thickness of the adhesive 24 between the glass sheet 30 and the frame 70 is controlled to a desired level. Finally, as shown in FIG. 3C, the first automated pick mechanism 10 has released the force distribution plate 41 from the clamping cover 42, leaving the fixture 40a in a position to hold the frame 70, adhesive 24 and glass sheet 30 together during the period of time necessary to cure the adhesive 24, e.g., a duration of 15 minutes or more when the adhesive 24 is a structural adhesive.

Figure 3D:
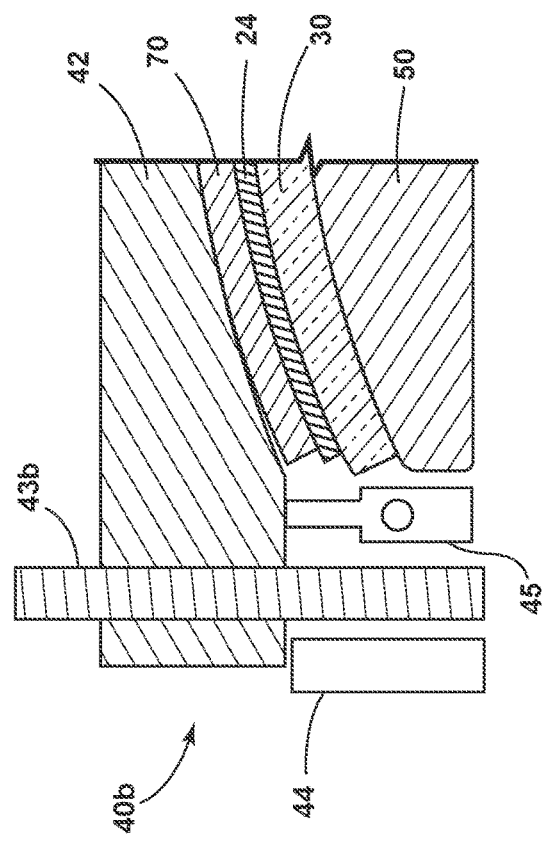
FIG. 3D is a cross-sectional, schematic view of a clamping fixture with a stop element to control a thickness of an adhesive disposed between the glass sheet and a frame, according to an embodiment.

Referring now to FIG. 3D, a cross-sectional, schematic view of a clamping fixture 40b is shown in exemplary form. The clamping fixture 40b includes a stop element 45, which assists in the control of the thickness of the adhesive 24 disposed between the glass sheet 30 and a frame 70, according to an embodiment of the disclosure. As also shown in exemplary form in FIG. 3D, the clamping fixture 40b includes a clamping cover 42, guides 43b and a holding mechanism 44. As shown in FIG. 3D, the stop element 45 can be set at varying heights (e.g., by adjusting the height of the stop element 45 or employing one of a various stop elements 45 with a desired height) to control the thickness of the adhesive 24 disposed between the glass sheet 30 and the frame 70. The guides 43b function in a similar manner as the guides 43 employed in the clamping fixture 40a described earlier and shown in FIGS. 3A-3C. Further, the holding mechanism 44 can hold the clamping cover 42 in place and aid in the application of a nominal and uniform load to the adhesive 24 by the clamping cover 42, all of which can also aid in the control of the thickness of the adhesive 24 as disposed between the glass sheet 30 and the frame 70.

Figure 4:
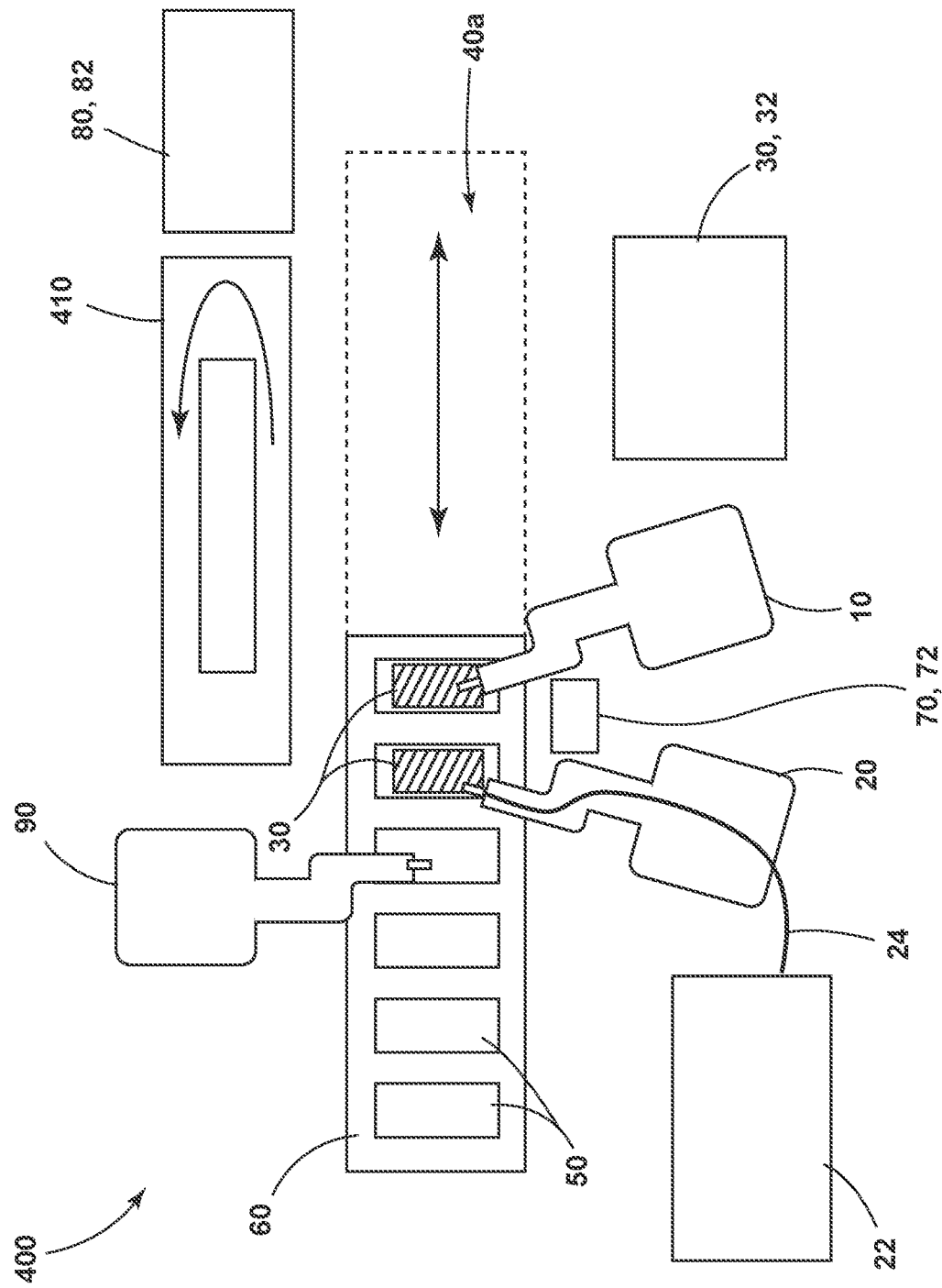
FIG. 4 is a plan view schematic of a manufacturing apparatus with a moveable table and a recycling track for cold-shaping glass sheets, according to an embodiment.

Referring now to FIG. 4, a plan view schematic of a manufacturing apparatus 400 for cold-shaping a glass sheet 30 is provided, according to an embodiment of the disclosure. The apparatus 400 includes one or more clamping fixtures 40a (see FIGS. 3A-3C and corresponding description above) and a recycling track 410. Unless otherwise noted, the apparatus 400 is substantially similar in function and structure to the apparatus 100-100b depicted in FIGS. 1-1B, and like-numbered elements have the same or substantially the same structure and function. As depicted in FIG. 4, the apparatus 400 includes one or more clamping fixtures 40a. According to some embodiments, the clamping fixtures 40a can be substituted with the clamping fixtures 40b depicted in FIG. 3D, as described above. As also shown in exemplary form, the apparatus 400 includes a second automated pick mechanism 90 (see also FIG. 1B and corresponding description above). The second pick mechanism 90 can be configured to move each finished glass sheet assembly 80 off of the moveable table 60, e.g., into the finished part cassette 82. In some embodiments, the second pick mechanism 90 can be configured to reposition the clamping fixture(s) 40a onto the recycling track 410, once they have been disengaged from the finished glass sheet assemblies 80. The recycling track 410 can then reposition the clamping fixtures 40a in a location for ease of positioning by the second pick mechanism 90. Once repositioned or otherwise recycled, the clamping fixture 40a can be employed by the second pick mechanism 90 or first automated pick mechanism to press each frame 70 and the adhesive 24 onto the glass sheet 30 to define a new finished glass sheet assembly 80. An advantage of the apparatus 400 for cold-shaping a glass sheet 30 is that it is arranged to ensure efficiency of use for the clamping fixtures 40a. In particular, the inclusion of the recycling track 410 allows the apparatus 400 to reuse a few clamping fixtures 40a in the course of cold-shaping glass sheets 30 at high levels of manufacturing throughput.

Figure 5A:
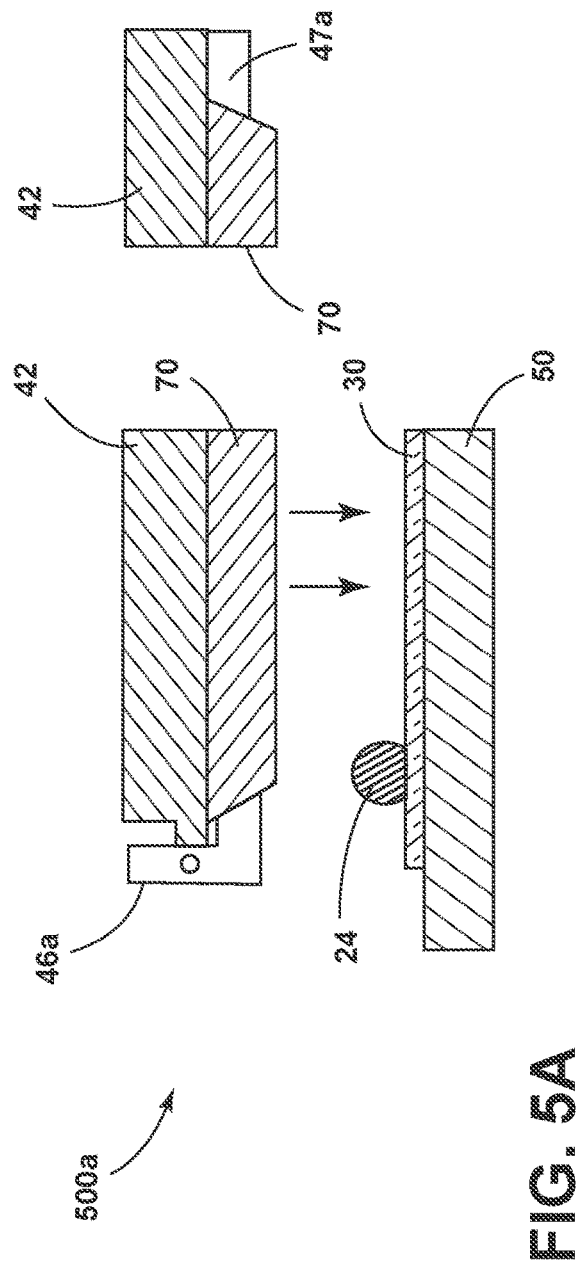
FIGS. 5A and 5B are cross-sectional, schematic views of a clamping fixture with elements to hold frames to the fixture during manufacturing, according to embodiments of the disclosure.
Figure 5B:
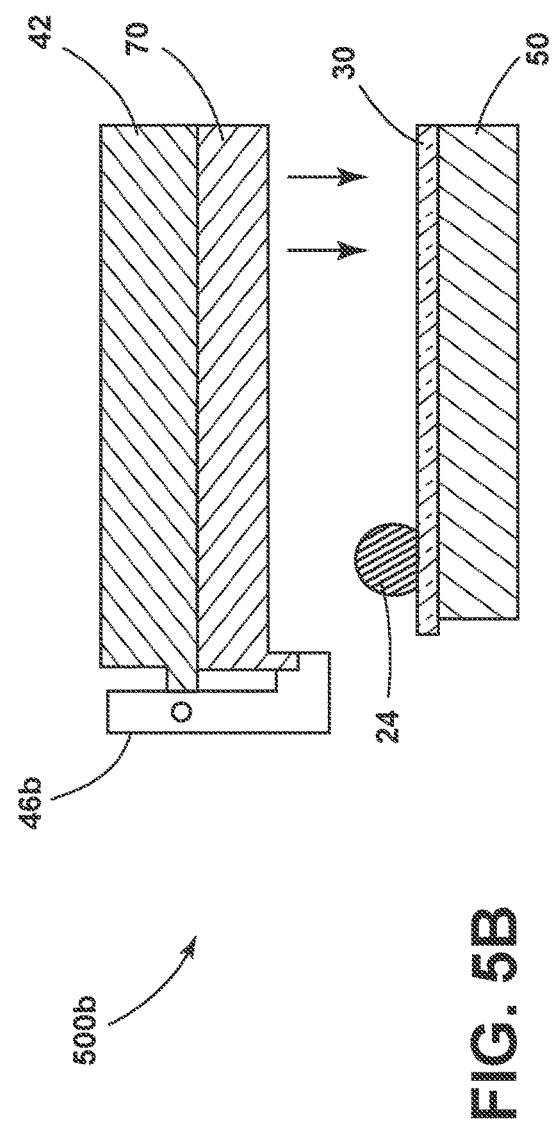

Referring now to FIGS. 5A and 5B, cross-sectional, schematic views of clamping fixtures 500a and 500b are provided with elements to hold frames 70 to the fixture during manufacturing, according to embodiments of the disclosure. Unless otherwise noted, the clamping fixtures 500a and 500b depicted in FIGS. 5A and 5B are substantially similar to the clamping fixtures 40a and 40b depicted in FIGS. 3A-3D, with like-numbered elements having the same or substantially the same structure and function. In particular, the clamping fixture 500a depicted in FIG. 5A includes a clamping cover 42 (see also FIGS. 3A-3D), a spring-loaded retention clip 46a, and a hard stop 47a. Similarly, the clamping fixture 500b depicted in FIG. 5B includes a clamping cover 42, and a spring-loaded retention clip 46b. The spring-loaded clips 46a and 46b of the clamping fixtures 500a, 500b assist in holding the frame 70 against the clamping cover 42. Further, the clip 46a can bias the frame 70 against the hard stop 47a. An advantage of the clamping fixtures 500a and 500b is that each such fixture helps ensure easy and quick removal of the clamping cover 42 from the frame 70, once the frame 70 has been bonded to the glass sheet 30 by the adhesive 24 and the adhesive 24 has been cured for sufficient duration for the desired level of curing.

Embodiment 1. According to a first embodiment, an apparatus for cold-shaping a glass sheet is provided. The apparatus comprises: a plurality of vacuum chucks configured within a moveable table; a first automated pick mechanism proximate the table; an automated dispensing mechanism proximate the table; and a pressing apparatus. The first pick mechanism is configured to shape a glass sheet onto one of the chucks. The dispensing mechanism is configured to dispense a curable adhesive onto the glass sheet or a frame. One of the first pick mechanism and the dispensing mechanism is configured to position the frame onto the glass sheet such that the adhesive is disposed between the glass sheet and the frame. The pressing apparatus is configured to press the frame and the adhesive onto the glass sheet to define a finished glass sheet assembly. Further, the glass sheet is bendable at ambient temperature.

Embodiment 2. According to a second embodiment, the first embodiment is provided, wherein the pressing apparatus is further configured to control a thickness of the adhesive disposed between the glass sheet and the frame.

Embodiment 3. According to a third embodiment, either one of the first or second embodiments is provided, wherein the moveable table is arranged in a linear configuration.

Embodiment 4. According to a fourth embodiment, the third embodiment is provided, wherein the moveable table is further defined by a width that comprises a plurality of rows, each row comprising a plurality of chucks.

Embodiment 5. According to a fifth embodiment, either one of the first or second embodiments is provided, wherein the moveable table is arranged in a rotary configuration.

Embodiment 6. According to a sixth embodiment, any one of the first through fifth embodiments is provided, further comprising: a second automated pick mechanism proximate the table, wherein the second pick mechanism is configured to move each finished glass sheet assembly off of the table.

Embodiment 7. According to a seventh embodiment, a method for cold-shaping a glass sheet is provided. The method comprises: positioning a glass sheet on one of a plurality of vacuum chucks configured within a moveable table; cold-shaping the glass sheet onto the chuck; affixing the glass sheet to the chuck with a vacuum; applying a curable adhesive onto one or both of a primary surface of the glass sheet and a primary surface of the frame; positioning the frame onto the adhesive and the glass sheet such that the adhesive is disposed between the glass sheet and the frame; pressing the frame and the adhesive onto the glass sheet to define a finished glass sheet assembly; and curing the adhesive for a duration. Further, the glass sheet is bendable at ambient temperature.

Embodiment 8. According to an eighth embodiment, the seventh embodiment is provided, wherein the pressing step is further conducted to control a thickness of the adhesive disposed between the glass sheet and the frame.

Embodiment 9. According to a ninth embodiment, either one of the seventh or eighth embodiments is provided, wherein the moveable table is arranged in a linear configuration.

Embodiment 10. According to a tenth embodiment, either one of the seventh or eighth embodiments is provided, wherein the moveable table is arranged in a rotary configuration.

Embodiment 11. According to an eleventh embodiment, any one of the seventh through tenth embodiments is provided, wherein the positioning a glass sheet and the cold-shaping steps are conducted with a first automated pick mechanism.

Embodiment 12. According to a twelfth embodiment, any one of the seventh through eleventh embodiments is provided, wherein the applying a curable adhesive step is conducted with an automated dispensing mechanism.

Embodiment 13. According to a thirteenth embodiment, any one of the seventh through twelfth embodiments is provided, wherein the pressing the frame step is conducted with a clamping fixture.

Embodiment 14. According to a fourteenth embodiment, any one of the seventh through thirteenth embodiments is provided, wherein the adhesive is a structural thermoset adhesive, the curing step is conducted with thermal energy, and the duration is at least 15 minutes.

Embodiment 15. According to a fifteenth embodiment, an apparatus for cold-shaping a glass sheet is provided. The apparatus comprises: a plurality of vacuum chucks configured within a moveable table; a first automated pick mechanism proximate the table; an automated dispensing mechanism proximate the table; and a clamping fixture. The first pick mechanism is configured to shape a glass sheet onto one of the chucks. The dispensing mechanism is configured to dispense a curable adhesive onto the glass sheet or a frame. One of the first pick mechanism and the dispensing mechanism is configured to position the frame onto the glass sheet such that the adhesive is disposed between the glass sheet and the frame. The clamping fixture is configured to press the frame and the adhesive onto the glass sheet to define a finished glass sheet assembly. Further, the glass sheet is bendable at ambient temperature.

Embodiment 16. According to a sixteenth embodiment, the fifteenth embodiment is provided, wherein the clamping fixture comprises a stop element to control a thickness of the adhesive disposed between the glass sheet and the frame.

Embodiment 17. According to a seventeenth embodiment, either one of the fifteenth or sixteenth embodiments is provided, wherein the moveable table is arranged in a linear configuration.

Embodiment 18. According to an eighteenth embodiment, either one of the fifteenth or sixteenth embodiments is provided, wherein the moveable table is arranged in a rotary configuration.

Embodiment 19. According to a nineteenth embodiment, any one of the fifteenth through eighteenth embodiment is provided, further comprising: a second automated pick mechanism proximate the table, wherein the second pick mechanism is configured to move each finished glass sheet assembly off of the table.

Embodiment 20. According to a twentieth embodiment, the nineteenth embodiment is provided, wherein the second pick mechanism is further configured to remove the clamping fixture from the frame of each finished glass sheet assembly.

Embodiment 21. According to a twenty-first embodiment, the twentieth embodiment is provided, wherein the second pick mechanism is further configured to reposition the clamping fixture onto a recycling track after removal from the frame of a finished glass sheet assembly.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. An apparatus for cold-shaping a glass sheet, comprising:
a plurality of vacuum chucks configured within a moveable table;
a first automated pick mechanism proximate the table;
an automated dispensing mechanism proximate the table; and
a pressing apparatus,
wherein the first pick mechanism is configured to shape a glass sheet onto one of the chucks,
wherein the dispensing mechanism is configured to dispense a curable adhesive onto the glass sheet or a frame,
wherein one of the first pick mechanism and the dispensing mechanism is configured to position the frame onto the glass sheet such that the adhesive is disposed between the glass sheet and the frame,
wherein the pressing apparatus is configured to press the frame and the adhesive onto the glass sheet to define a finished glass sheet assembly,
wherein the pressing apparatus is further configured to control a thickness of the adhesive disposed between the glass sheet and the frame via a stop element disposed at an adjustable height relative to the plurality of chucks, and
further wherein the glass sheet is bendable at ambient temperature.

2. The apparatus of claim 1, wherein the stop element is separate from the plurality of vacuum chucks.

3. The apparatus of claim 1, wherein the moveable table is arranged in a linear configuration.

4. The apparatus of claim 3, wherein the moveable table is further defined by a width that comprises a plurality of rows, each row comprising a plurality of chucks.

5. The apparatus of claim 1, wherein the moveable table is arranged in a rotary configuration.

6. The apparatus of claim 1, further comprising:
a second automated pick mechanism proximate the table, wherein the second pick mechanism is configured to move each finished glass sheet assembly off of the table.

7. An apparatus for cold-shaping a glass sheet, comprising:
a plurality of vacuum chucks configured within a moveable table;
a first automated pick mechanism proximate the table;
an automated dispensing mechanism proximate the table; and
a clamping fixture,
wherein the first pick mechanism is configured to shape a glass sheet onto one of the chucks,
wherein the dispensing mechanism is configured to dispense a curable adhesive onto the glass sheet or a frame,
wherein one of the first pick mechanism and the dispensing mechanism is configured to position the frame onto the glass sheet such that the adhesive is disposed between the glass sheet and the frame,
wherein the clamping fixture is configured to press the frame and the adhesive onto the glass sheet to define a finished glass sheet assembly,
wherein the clamping fixture comprises:
a clamping cover configured to attach to the frame; and
a holding mechanism configured to hold the clamping cover in place to apply a load to the adhesive when the automated pick mechanism is released from the clamping fixture, and
wherein the glass sheet is bendable at ambient temperature.

8. The apparatus of claim 7, wherein the clamping fixture comprises a stop element to control a thickness of the adhesive disposed between the glass sheet and the frame.

9. The apparatus of claim 7, wherein the moveable table is arranged in a linear configuration or a rotary configuration.

10. The apparatus of claim 7, further comprising:
a second automated pick mechanism proximate the table, wherein the second pick mechanism is configured to move each finished glass sheet assembly off of the table.

11. The apparatus of claim 10, wherein the second pick mechanism is further configured to remove the clamping fixture from the frame of each finished glass sheet assembly.

12. The apparatus of claim 11, further comprising a recycling track extending to a position accessible by the second automated pick mechanism, wherein the recycling track is separate from the movable table, and wherein the second pick mechanism is further configured to reposition the clamping fixture onto the recycling track after removal from the frame of each finished glass sheet assembly.

13. The apparatus of claim 7, wherein the clamping fixture comprises a spring-loaded retention clip configured to releasably hold the clamping cover against the frame.

14. The apparatus of claim 13, wherein the clamping fixture further comprises a hard stop configured to prevent the frame from sliding relative to the clamping cover as a result of force from the spring-loaded retention clip.

15. The apparatus of claim 7, further comprising guides configured to align the frame with the glass sheet via engagement with the clamping cover.

16. The apparatus of claim 7, wherein the first pick mechanism comprises a force distribution plate through which force is applied to the clamping cover.

* * * * *